US008176300B2

(12) United States Patent
Goyal et al.

(10) Patent No.: US 8,176,300 B2
(45) Date of Patent: May 8, 2012

(54) METHOD AND APPARATUS FOR CONTENT BASED SEARCHING

(75) Inventors: Rajan Goyal, Saratoga, CA (US); Muhammad Raghib Hussain, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 922 days.

(21) Appl. No.: 12/229,617

(22) Filed: Aug. 25, 2008

(65) Prior Publication Data

US 2010/0050177 A1 Feb. 25, 2010

(51) Int. Cl.
G06F 7/38 (2006.01)
G06F 9/00 (2006.01)
G06F 9/44 (2006.01)
G06F 15/00 (2006.01)

(52) U.S. Cl. ........................................ 712/220
(58) Field of Classification Search .................. None
See application file for complete search history.

(56) References Cited

U.S. PATENT DOCUMENTS

| 5,031,090 | A  | * | 7/1991  | Banach et al. ........... 709/202 |
| 6,658,477 | B1 | * | 12/2003 | Lisitsa et al. ........... 709/231 |
| 7,706,261 | B2 | * | 4/2010  | Sun et al. ............... 370/230 |
| 2006/0069872 | A1 | | 3/2006 | Bouchard et al. |
| 2006/0075206 | A1 | | 4/2006 | Bouchard et al. |
| 2006/0085533 | A1 | | 4/2006 | Hussain et al. |
| 2007/0038798 | A1 | | 2/2007 | Bouchard et al. |

* cited by examiner

Primary Examiner — Corey S Faherty
(74) Attorney, Agent, or Firm — Hamilton, Brook, Smith & Reynolds, P.C.

(57) ABSTRACT

The scheduling of multiple request to be processed by a number of deterministic finite automata-based graph thread engine (DTE) workstations is processed by a novel scheduler. The scheduler may select an entry from an instruction in a content search apparatus. Using attribute information from the selected entry, the scheduler may thereafter analyze a dynamic scheduling table to obtain placement information. The scheduler may determine an assignment of the entry, using the placement information, that may limit cache thrashing and head of line blocking occurrences. Each DTE workstation may including normalization capabilities. Additionally, the content searching apparatus may employ an address memory scheme that may prevent memory bottle neck issues.

48 Claims, 12 Drawing Sheets

| 741 | 740 | 743 | 745 | 747 | 749 | |
|---|---|---|---|---|---|---|
| DTE | Allocated | Idle Time | Request Queue | DFA in Cache | DTE Setting | Flag Setting |
| 0 | 0 | 5 sec | 0% | 2-5 | Static | On/Off |
| 1 | 1 | 0 sec | 20% | 2-4 | Dynamic | On/Off |
| ... N | ... 1 | 0 sec | 100% | 5 | Static | On/Off |

Processing Table

METHOD AND APPARATUS FOR CONTENT BASED SEARCHING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc*xyz." That is, find the string "abc," followed by the string "xyz," with an unlimited number of characters in-between "abc" and "xyz." Another example is the regular expression "abc??abc*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as Deterministic Finite Automata (DFA) to process the regular expression. The DFA processes an input stream of characters sequentially using a DFA graph and makes a state transition based on the current character and state.

SUMMARY

An improved security appliance providing decreased processing times is desired. Example embodiments of a processor, and corresponding method, for scheduling an entry to a deterministic finite automata-based graph thread engine (DTE) workstation are disclosed. The processor may include scheduler. The scheduler may include a selector configured to select an entry from an instruction queue, a scheduling table configured to provide DTE placement information based on at least one attribute associated with the entry, and an assigner configured to determine an assignment of the entry based on the DTE placement information. The scheduling table may be dynamically updated by the scheduler and/or an individual DTE workstation. The processor may also include a system memory unit where different arcs of a deterministic finite automata-based graph may be stored across multiple memory interfaces.

The instruction queue entry may include processing instructions associated with a particular deterministic finite automata-based graph, graph cache reassignment instructions, and/or instructions to assign a particular deterministic finite automata-based graph to at least one DTE workstation. The instructions to assign a particular deterministic finite automata-based graph may be static instructions that deem that the at least one DTE workstation may not be thrashable. The attribute may include a graph identifier and/or a DTE identifier.

The DTE placement information may be an indication listing including at least one DTE workstation that is currently processing a graph associated with the attribute. The DTE placement information may also be a request queue status of at least one DTE workstation associated with the attribute. The DTE placement information may also be an idleness factor of at least one DTE workstation. The DTE placement information may also an allocation status of at least one DTE workstation. The DTE placement information may be a flag setting.

If there are no available DTE workstations associated with the at least one attribute, the assigner may be configured to define the assignment based solely on the DTE placement information, where the entry may be assigned to a suitable DTE workstation. A suitable DTE workstation may be an unallocated DTE workstation, a most idle DTE workstation, and/or a purged DTE workstation.

If there are no available DTE workstations, the assigner may be configured skip the entry in the instruction queue and the selector may be configured to select another entry. The processor may also include a counter that may be configured to determine an allowed number of entries that are left in the instruction queue by the assigner. The counter may also be configured to determine an allowable duration of time that an entry may remain in the instruction queue. The entry may be a member of a sequential set of entries and the assigner may be configured to assign each entry of the sequential set to a same DTE workstation to be processed in order.

An individual DTE workstation may include a core processor that may be configured to normalize a payload of the entry and may also traverse an associated deterministic finite automata-based graph. An individual DTE workstation may also include a local graph cache that may be configured to store an associated deterministic finite automata-based graph. A DTE workstation may be a DTE cluster including a multiple number of DTE cores that may be configured to process a same DFA graph.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

U.S. patent application Ser. No. 11/982,391 filed Nov. 1, 2007, U.S. patent application Ser. No. 11/982,433 filed Nov. 1, 2007, U.S. patent application Ser. No. 11/986,970 filed Nov. 27, 2007, and U.S. patent application Ser. No. 11/986,975 filed Nov. 27, 2007 are all assigned to the same assignee and are herein incorporated by reference.

Figure 1:
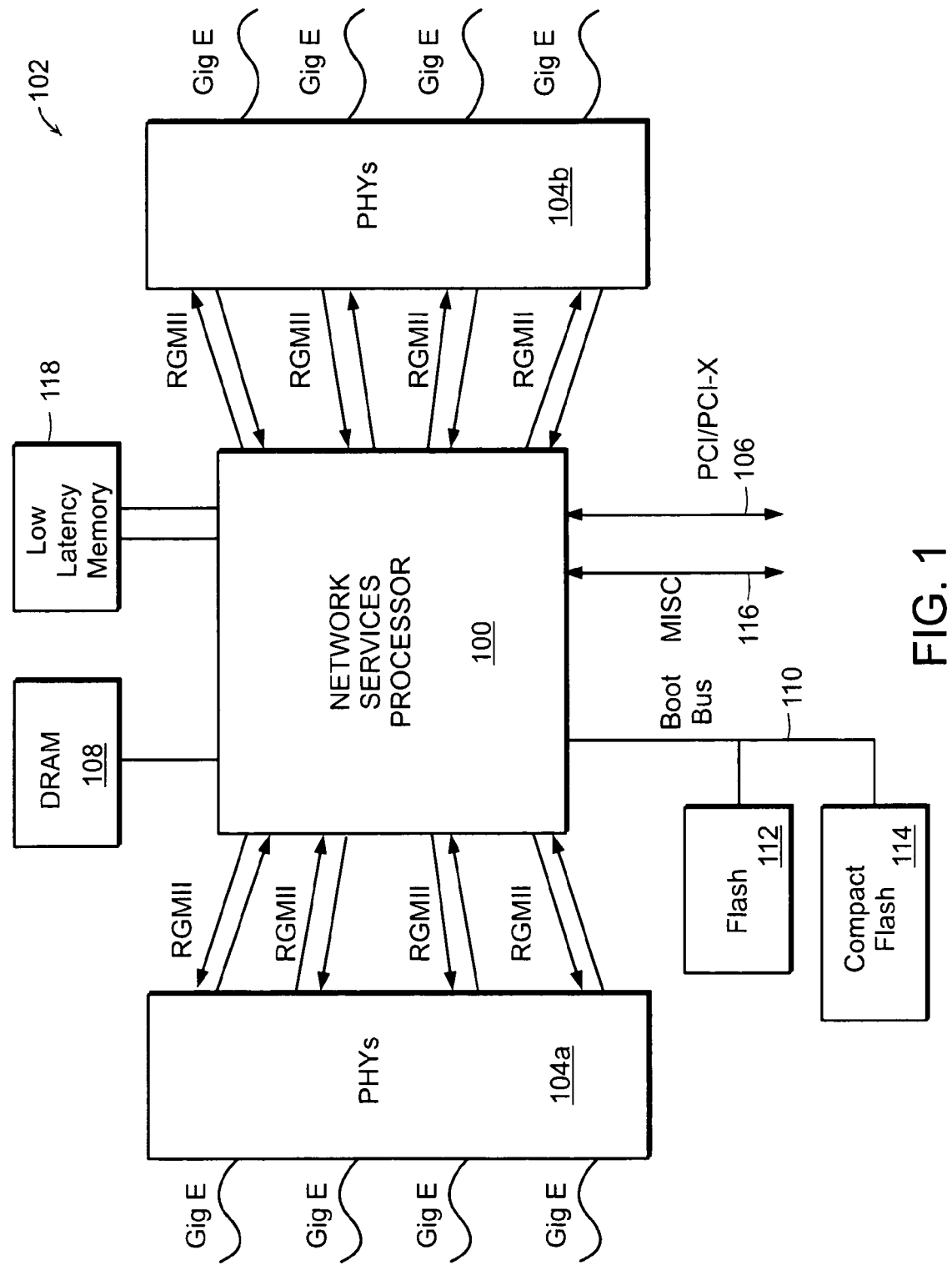
FIG. 1 is a block diagram of a security appliance including a network services processor.

FIG. 1 is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabyte Media Independent Interface (RGMII) connections to the off-chip PHYs 104a, 104b.

The network services processor 100 may also receive packets from the Ethernet ports (Gig E) through the physical interfaces PHY 104a, 104b, and perform L7-L2 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a low latency memory controller for controlling low latency Dynamic Random Access Memory (DRAM) 118. The low latency DRAM 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA graph expression searches.

A boot bus 110 may provide boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the Peripheral Component Interconnect (PCI) bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

Figure 2:
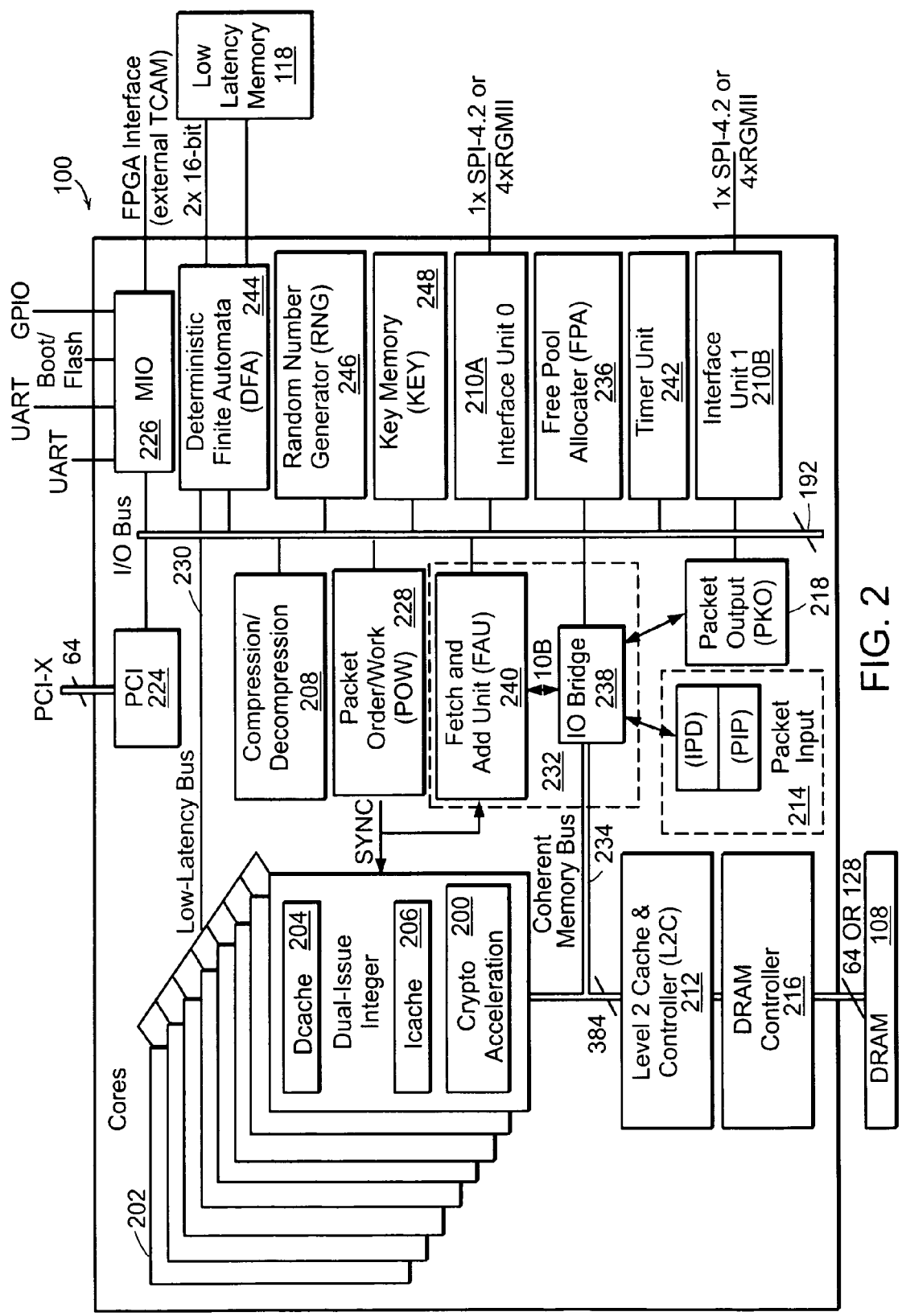
FIG. 2 is a block diagram of the network services processor shown in FIG. 1.

FIG. 2 is a block diagram of the network services processor 100 shown in FIG. 1. The network services processor 100 delivers high application performance using a plurality of processors (cores) 202 located on a L1 network protocol. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external low latency memory 118. The memory subsystem is architected for multi-processor support and tuned to deliver both high-throughput and low-latency required by memory intensive content networking applications. Level 2 cache memory 212 and external DRAM memory 108 (FIG. 1) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a DFA co-processor 244 that performs Deterministic Finite Automata (DFA) and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a deterministic finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ô and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct[ . . . ] allows listing of a list of characters to search for, e.g. gr[ea]y looks for both grey and gray. A dash indicates a range of characters, for example, [A-Z]. The meta-character "." matches any one character.

The input to the DFA state machine is typically a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph may be stored in low latency memory 118, or the main DRAM 108, and may be accessed by the processors 202 over the low latency bus. The processors 202 may access a DFA-based graph stored in the low latency memory, or the main DRAM 108, directly. The graph will be described later in conjunction with FIG. 4.

Figure 3:
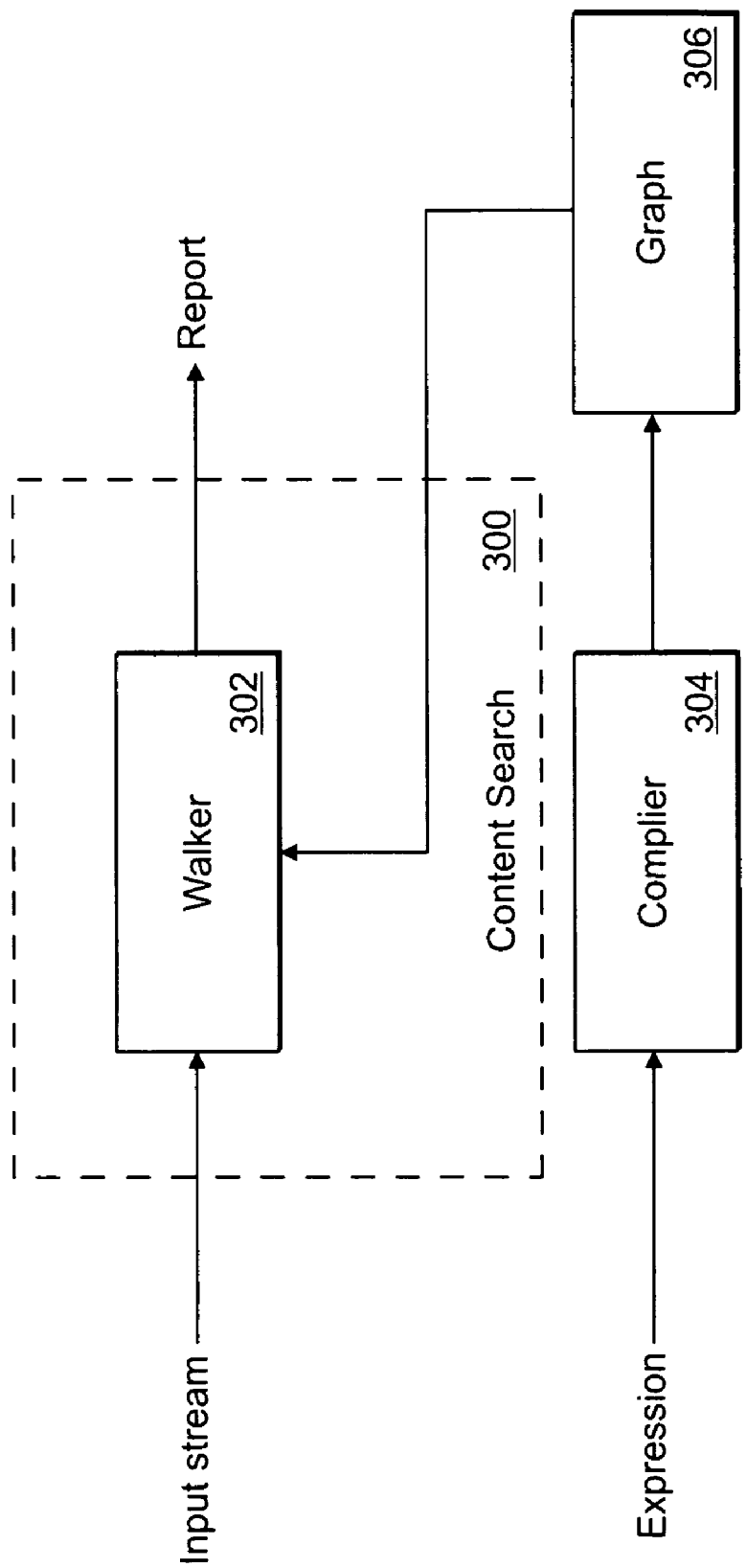
FIG. 3 is a block diagram illustrating content search elements used by the processor of FIG. 1.

FIG. 3 is a block diagram illustrating content search macros that may be used by a processor 202 in the network services processor 100 shown in FIG. 2. Content search macros 300 may include a walker software component (process) 302 for searching the DFA-based content search graph that may be generated via a compiler software component 304. The content search macros 300 may be stored in L2/DRAM (212, 108) and may be executed by a processor 202. The DFA-based content search graph may be stored in low latency memory 118 which is accessible directly by the processor 202 through the low latency bus and low-latency memory controller shown in FIG. 2. The compiler 304 translates expressions into a DFA-based content search graph with a plurality of nodes.

After the compiler 304 has generated the content search graph and the graph stored in low latency memory 118, or in main DRAM 108, the walker process 302 executed by one of the processors 202 walks input data (e.g., a string of characters) in the received data packet one character at a time and outputs a set of matches based on a search for a pattern in the input data using the content search graph.

Figure 4:
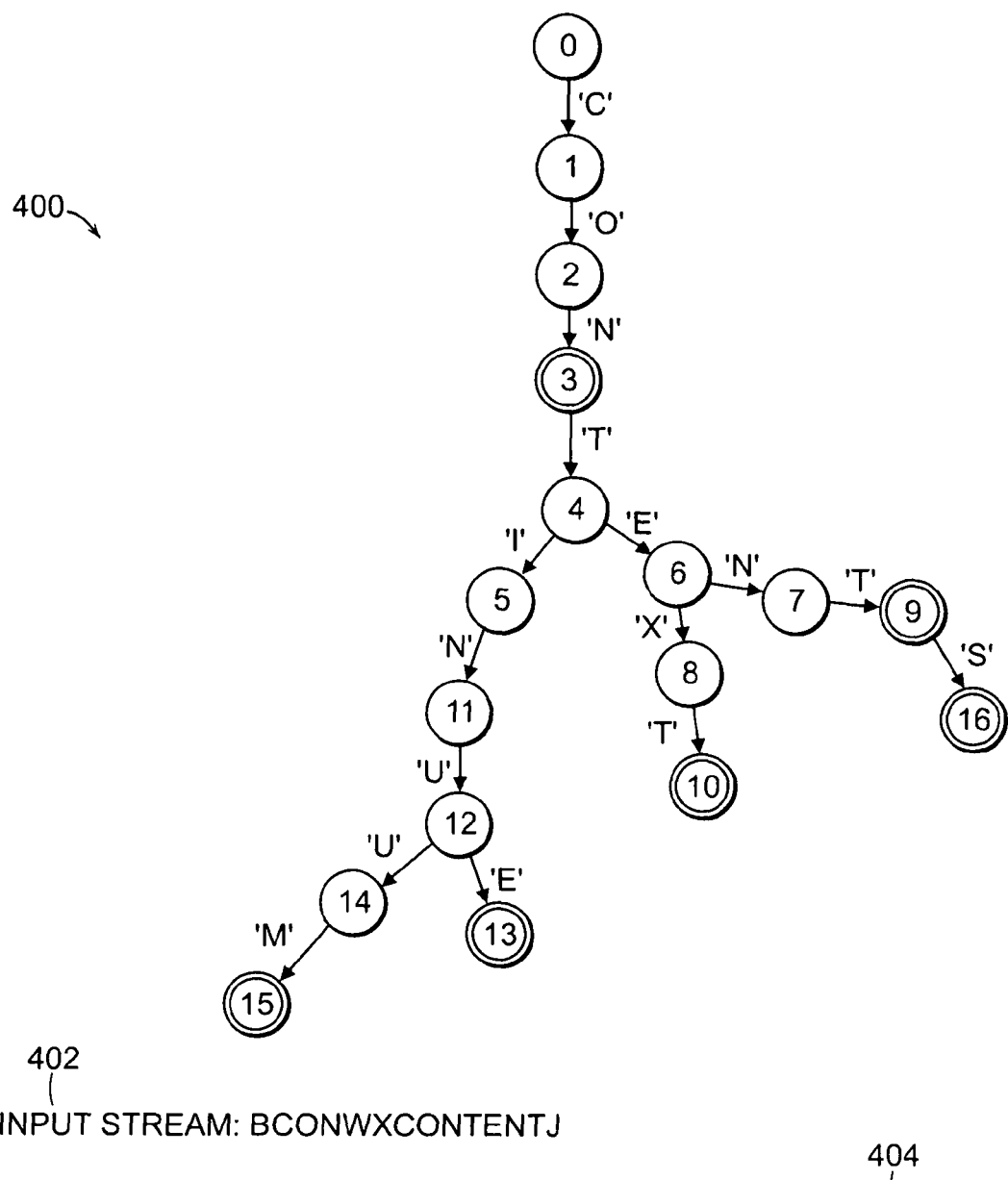
FIG. 4 is an example of a DFA graph.

FIG. 4 provides an example of a DFA graph 400 complied via the compiler 304. For simplicity, only forward arcs have been illustrated in the example graph 400. The node marked as '0' is the root node and is a starting position for traversing the graph 400 with the walker process 302. Each of the nodes are interconnected through arcs represented by the lines connecting each node. The arcs shown in FIG. 4 are forward arcs representing a character match between the expression being searched and an input character. The nodes comprising a double line (e.g., nodes 3, 9, 10, 13, 15, and 16) are referred to as mark nodes and represent a string match in the input stream. For example, the double line around node 3 represents a string match of 'CON'; node 9 represents a string match of 'CONTENT'; node 10 represents a string match of 'CONTEXT'; node 13 represents a string match of 'CONTINUE'; node 15 represents a string match of 'CONTINUUM'; and node 16 representing a string match of 'CONTENTS.' A table 404 illustrates all of the possible expression matches, and the corresponding nodal paths, for the example DFA graph 400.

In operation, the walker process 302 may evaluate the input stream one byte at a time. As an example, consider the input stream 402. The walker 302 evaluates the first character of the input stream 402 which is 'B.' The walker then proceeds to the root node to access the next node pointer associated with the character 'B.' In the example provided by the DFA graph 400, the root node only includes a forward match for the character 'C.' Therefore, the arc associated with the character 'B' is a repeating arc (not shown) comprising a next node pointer pointing back to the root node '0.'

The walker process 302 then proceeds to the next character in the input stream 402 which is 'C.' Upon locating the arc associated with the character 'C,' the walker 302 finds a next node pointer providing a forward match and pointing to node '1.' The walker process 302 then intakes the next input stream character 'O,' and proceeds to find the associated arc and next node pointer providing a forward match and leading to node '3.' Since node '3' is a mark node, the walker process 302 registers that an expression match for the string 'CON' in the input stream has been found.

Depending on the specific IDS application, the walker process 302 may proceed to evaluate the next character in the input stream 402 and analyze the character 'W.' The arc in node '3' associated with the character 'W' comprises a backward next node pointer to the root node '0' since the only forward match associated with node '3' is for the character 'T.' The walker process then proceeds to search for the arc in the root node '0' associated with the current character 'W.' Upon finding that the associated arc is a repeating arc, pointing back to the root node '0,' the walker process 302 proceeds to evaluate the next character in the input stream 402, which is 'X.'

Upon evaluating the next input character 'X,' the associated arc in the root node '0' is a repeating next node pointer since the root node does not comprise a forward match for the character 'X.' Following the same logic discussed above, the walker process 302 may then proceed to find an expression match for the string 'CONTENT' in mark node '9.' Upon reading the next character 'J,' the walker process traverses back to the root node '0' and the arc and next node pointer associated with the character 'J' are read from the root node '0.' Upon detecting a repeating arc and reaching the end of the input stream 402, the walker process 302 completes its walking of the DFA graph 400.

It should be appreciated that the DFA graph illustrated in FIG. 4 is merely an example. In practice, the DFA graphs which are utilized are typically greater in size and complexity. As the size and complexity of a DFA graph increases, the processing speeds of security appliances and their respective network services processors decreases. Thus, in example embodiments, a network services processor including an external accelerator and DRAM dedicated to DFA processing is utilized.

Figure 5:
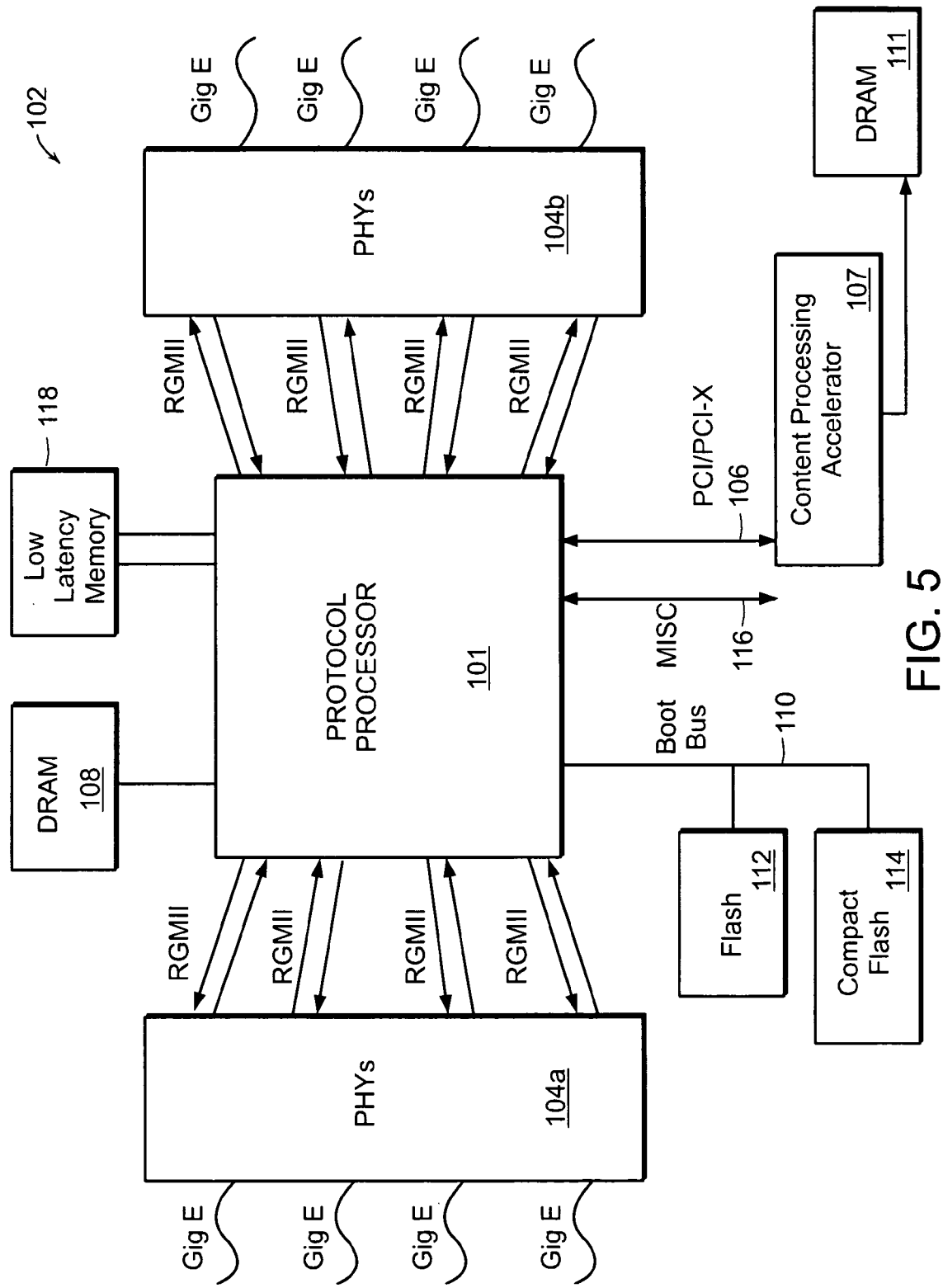
FIG. 5 is a block diagram of a security appliance including a network services processor and a protocol processor according to example embodiments.

FIG. 5 illustrates an example security appliance 102 including a protocol processor 101 and the components illustrated in FIG. 1. The security appliance 102 additionally includes a content processing accelerator 107, connected to the processor 101 via the PCI/PCI-X/PCIe connection 106, and an external DRAM 111 connected to the accelerator 107. The accelerator 107 and DRAM 111 may be employed in content search applications, therefore making all content searching operations external to the processor 101. Removing the content searching operations from the processor 101 may aid in reducing the processing time and complexity of the security appliance 102.

Figure 6:
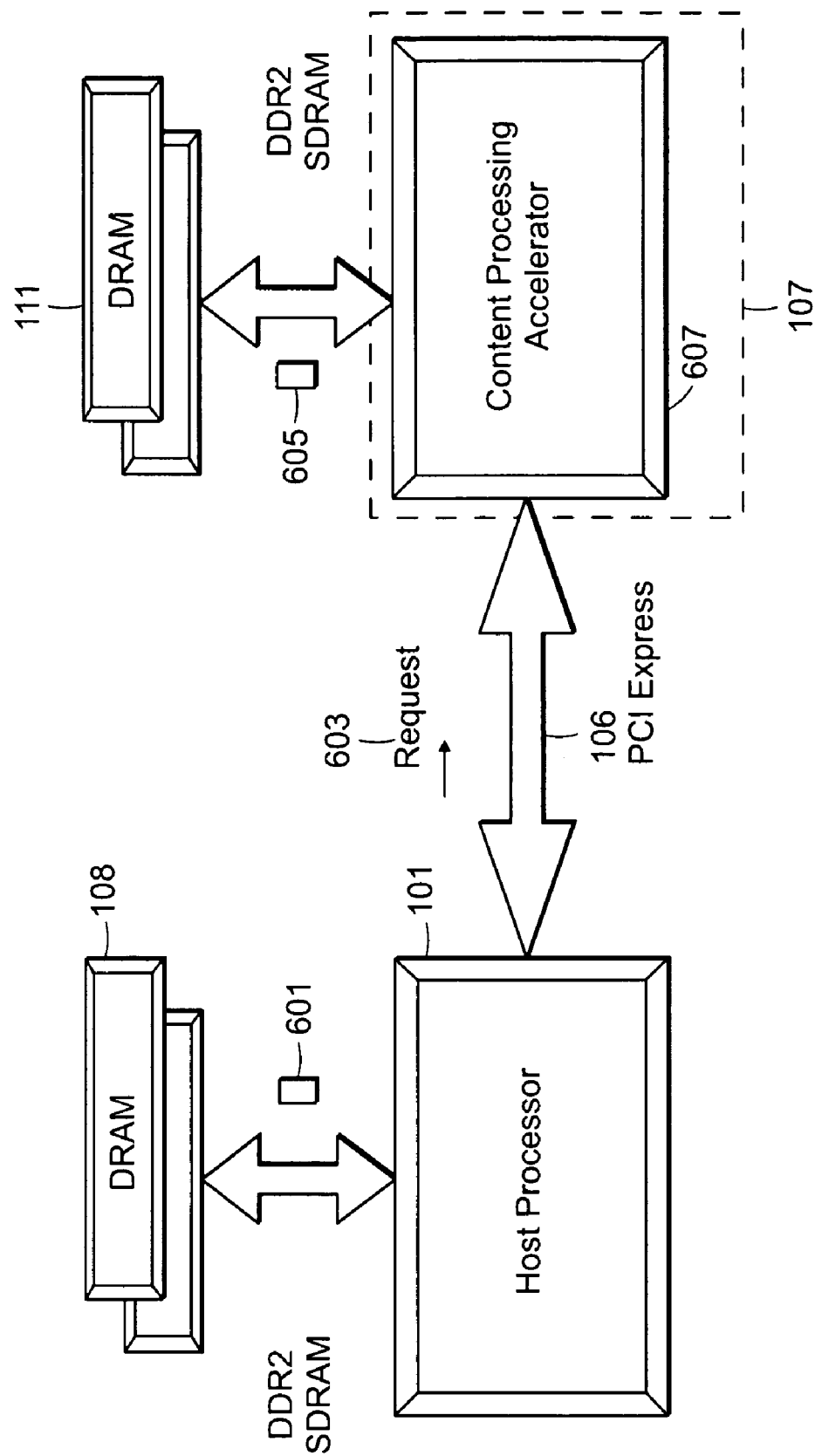
FIG. 6 is a block diagram of an overview of operations of the appliance of FIG. 5 according to example embodiments.

FIG. 6 illustrates an overview of operations that may be associated with the accelerator 107, according to example embodiments. The host, or protocol, processor 101 may first gather data 601 from the DRAM 108. The data may include pointers to a packet buffer, configured to store data to be processed, and a results buffer, configured to store the results of the processed data, respectively. The data may also include a pointer to rules or flag settings associated with the processing scheduling of the data.

Upon obtaining the data 601, the processor 101 may proceed to send the data to the accelerator 107 in the form of a request 603. The request 603 may additionally include instructions for processing and may be sent via the PCI express bus 106. The accelerator 107 may forward the request to a Content Processing Accelerator 607, for example a field programmable gate array (FPGA) or an application specific integrated circuit ASIC, which may be a sub-component of the accelerator that may oversee content search functions. Using the information provided in the request, the Content Processing Accelerator 607 may pull information 605, for example DFA graph data to be cached, from the DRAM 111 that may be used to perform the content searching. Upon obtaining a result from the content searching, the Content Processing Accelerator 607 may store the result in the DRAM 111 or send the result to the processor 101 via the PCI express 106.

Figure 7A:
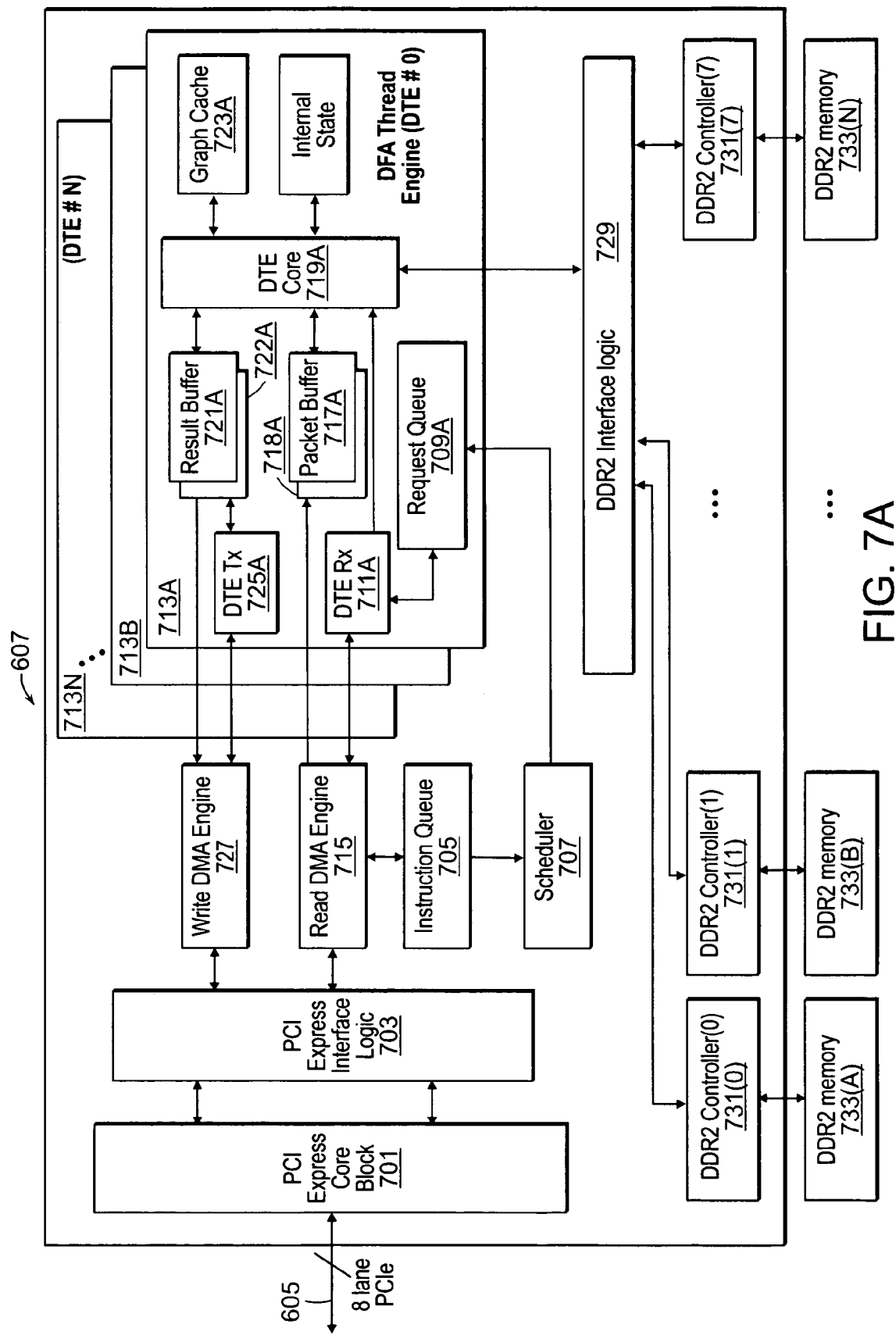
FIG. 7A is a block diagram of a Content Processing Accelerator of the appliance of FIGS. 5 and 6 according to example embodiments.

FIG. 7A illustrates a detailed view of the Content Processing Accelerator 607 shown in FIG. 6. Upon receiving a request from a host processor via the PCI express 605, the Content Processing Accelerator 607 may transfer the request to a PCI express core block 701. In example embodiments, the PCI express core block 701 may be a Xilinx Inc. Virtex 5 device which may be integrated with local exchange terminal (LXT) devices. The PCI express core block 701 may also be configured with four input lanes capable of providing a 5 Gb throughput solution. Alternatively, the PCI express core block 701 may be configured with eight input lines capable of providing a 10 Gb throughput solution.

The PCI express core block 701 may thereafter transfer the request to PCI express interface logic 703. The PCI logic 703 may interface with the PCI express core block 701 through a user logic interface and a host interface. The user logic interface (e.g., transaction interface) may provide a mechanism to generate and consume thread level parallelism (TLP) (e.g., the processing of multiple input streams with respect to multiple DFA graphs at once). The PCI logic 703 may also provide a request ready protocol with start-of-frame and end-of-frame packet boundary marking (e.g., defining a starting and ending point of each packet in the request). The PCI logic 703 may further provide a host interface (e.g., configuration interface) which may inspect the stage of the PCI express endpoint configuration space.

The PCI logic 703 may then proceed to send the request to a read DMA engine 715 that may in turn send the request to an instruction queue 705. Should the instruction queue be full, any excess requests may be stored in system memory of the host processor (101). In example embodiments, the size of each instruction may be 32 bytes. Thus, for a 10 Gb system, there may be space for 512 (possibly 1024) instructions on chip. Any instructions in excess of 512 may be saved in system memory. Two types of instructions may be utilized: (1) requests for pattern matching, or content searching; and (2) control requests to populate the graph cache in advance. For example, the population of a graph cache may be provided in anticipation of a large number of request for content searching of a particular DFA graph.

Figures 7B, 7C:
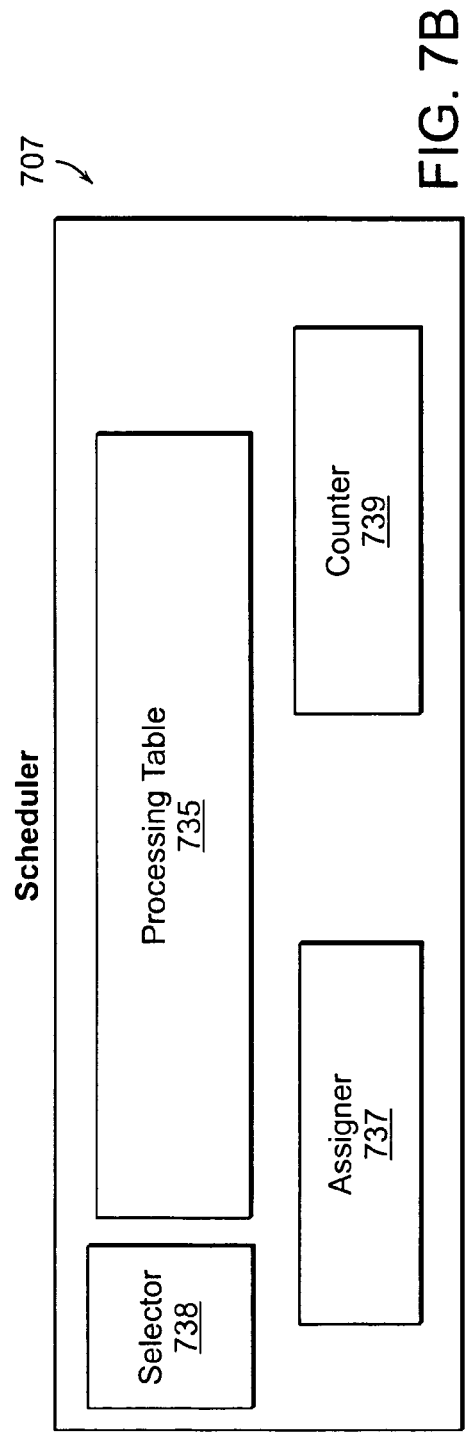
FIGS. 7B and 7C are block diagrams of the scheduler of FIG. 7A and a processing table, respectively, according to example embodiments.

A scheduler 707 may be employed to determine which request should be chosen to be processed, and to which of the numerous DFA thread engine (DTE) workstations (713A-713N) of the Content Processing Accelerator 607 the chosen request should be sent to. FIG. 7B further illustrates the scheduler 707. The scheduler may include a processing table 735, an assigner 737, a selector 738, and a counter 739. The selector 738 analyzes and selects the request 'A' at the top of the instruction queue 705 and the assigner 737 assigns that request as the current request. The counter 739 may track the duration of time a request is in the instruction queue and/or the number of requests in the queue.

The scheduler 707 may schedule the current request to a "right" DTE workstation. A right DTE workstation may be (1) a requested DTE workstation (e.g., the DTE workstation processing the DFA graph associated with the current request); (2) a next available DTE workstation (e.g., a DTE workstation that may be idle or unassigned to a particular DFA graph); or (3) a next suitable DTE workstation which avoids cache thrashing (e.g., clearing the cache of a DTE workstation and putting into cache memory DFA graph data associated with the current request to be scheduled).

FIG. 7C further illustrates an example of the processing table 735 of the scheduler 707. In analyzing what is the best suitable DTE workstation for the current request, the scheduler 707 may utilize the processing table 735, which may be stored in the system memory of the Content Processing Accelerator 607 or within the scheduler 707. The entries of the processing table 735 may include attributes such as a DTE identification number 741, a DTE allocation status 740, a DTE idle time value 743, memory availability of the request queue 745, the identification of the DFA in the DTE graph cache 747, and a DTE setting 749. The processing table may also include a flag setting status 741 that may provide information on how a right DTE workstation is to be determined. Note that all DTE workstations may include a respective request queue, which may store its associated requests, and a graph cache 723 which may store the portion of the DFA graph the DTE workstation is currently processing.

The DTE identification number 741 provides an identification marker for all of the DTE workstations in the Content Processing Accelerator 607. In the current example the identification markers are numbers 0-N, with N being the number of DTE workstation's in the Content Processing Accelerator 607. The processing table may have as many entries as there are DTE workstations. As shown in FIG. 7C, the DTE identification number entries are listed from 0-N.

The DTE allocation status 740 may provide a binary indication as to whether or not a particular DTE workstation has been assigned to work on a particular DFA or DFA sub-graph. For example, in the processing table 735, DTE workstation '0' has a '0' listed as its allocation status. Therefore, the DTE workstation indexed as '0' is not currently assigned to work on a particular DFA even though DTE workstation '0' may have a DFA stored in its associated cache. The DTE workstations indexed as '1' and 'N' are both currently allocated to work on a particular DTE workstation.

The DTE idle time value 743 provides information on how much time (for example, seconds) has lapsed since a particular DTE workstation has processed data. In the example provided by FIG. 7C, the DTE workstation indexed as '0' is listed as having a idle time value of 5 seconds indicating that the DTE workstation is not currently processing data. The DTE workstations indexed as '1' and 'N' are listed as having a idle time value of 0 seconds indicating that the DTE workstations are currently processing data.

In another example embodiment, the idle time indicator may be based on a counting system. For example, if a particular DTE workstation is marked as being allocated and its request queue is free, its idle time status may be incremented. Once the idle time status of a particular DTE workstation has reached a threshold, that DTE workstation's allocation status may be set to unallocated, thereby allowing indicating that the DTE workstation may process instructions based on any DFA.

The memory availability of the request queue 745 provides information on the amount of memory currently being used by the request queue of a particular DTE workstation. In the example provided by FIG. 7C, the processing table 735 indicates that the DTE workstations indexed as '0' and 'N' currently utilize 0% and 100% of the memory allocated for their respective request queue. The processing table 735 further indicates that DTE workstation indexed as '1' currently utilizes 20% of the memory allocated for its request queue.

The processing table 735 may also include an indication of the which DFA graph and/or sub-graph 747 each DTE workstation is processing. According to the example processing table 735, the DTE workstations indexed as '0' has a sub-portion labeled '5' of the graph indexed as '2' stored in its local cache. The DTE workstation '1' has a sub-portion labeled '4' of the graph indexed as '2' stored in its local cache. The DTE workstation 'N' has the entire graph indexed as '5' stored in its local cache. It should be appreciated that different sub-portions, or arcs, of a same DFA graph may be stored across different caches.

The processing table 735 may also include an attribute indicating a setting of the individual DTE workstations 749. The settings may dictate if a DTE workstation is to operate in a dynamic or static fashion. A DTE workstation may be marked as static, where the local cache of a static DTE workstation may not be thrashed (e.g., a clearing of the elements stored in cache). As a default, a DTE workstation may be marked dynamic, where the cache of the DTE. workstation may be thrashed if needed.

The processing table may track a current processing mode of each DTE workstation by continuously and dynamically updating the various attributes discussed above. Using the attribute information in the processing table 735, the assigner 737 may determine a placement for the current entry based on placement information based on the attributes. The processing table may be dynamically updated by either, or both, the scheduler and the DTE workstations of the system.

Figure 8A:
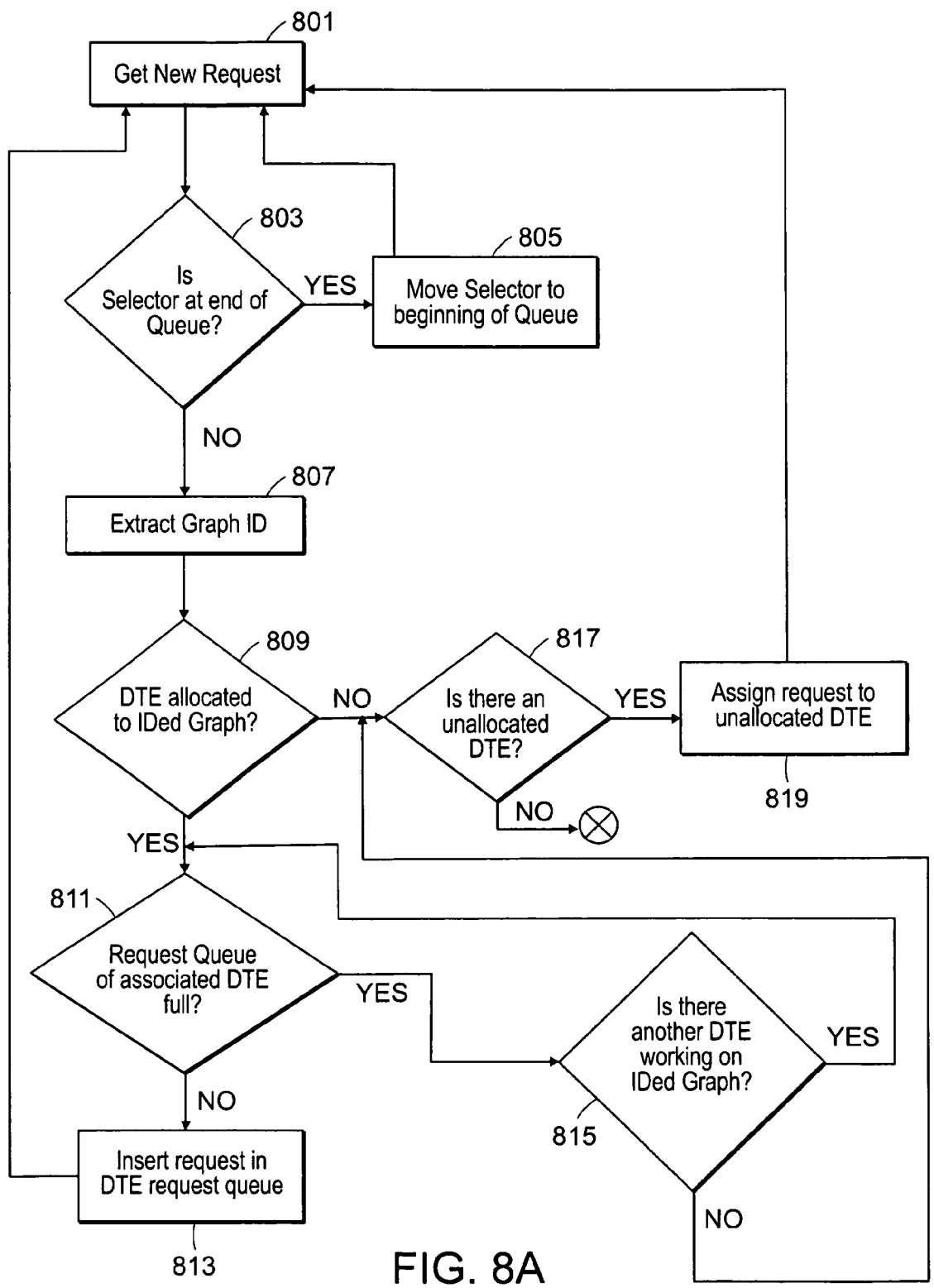
FIGS. 8A and 8B illustrate a flow diagram of operational steps of the scheduler shown in FIG. 7B according to example embodiments.
Figure 8B:
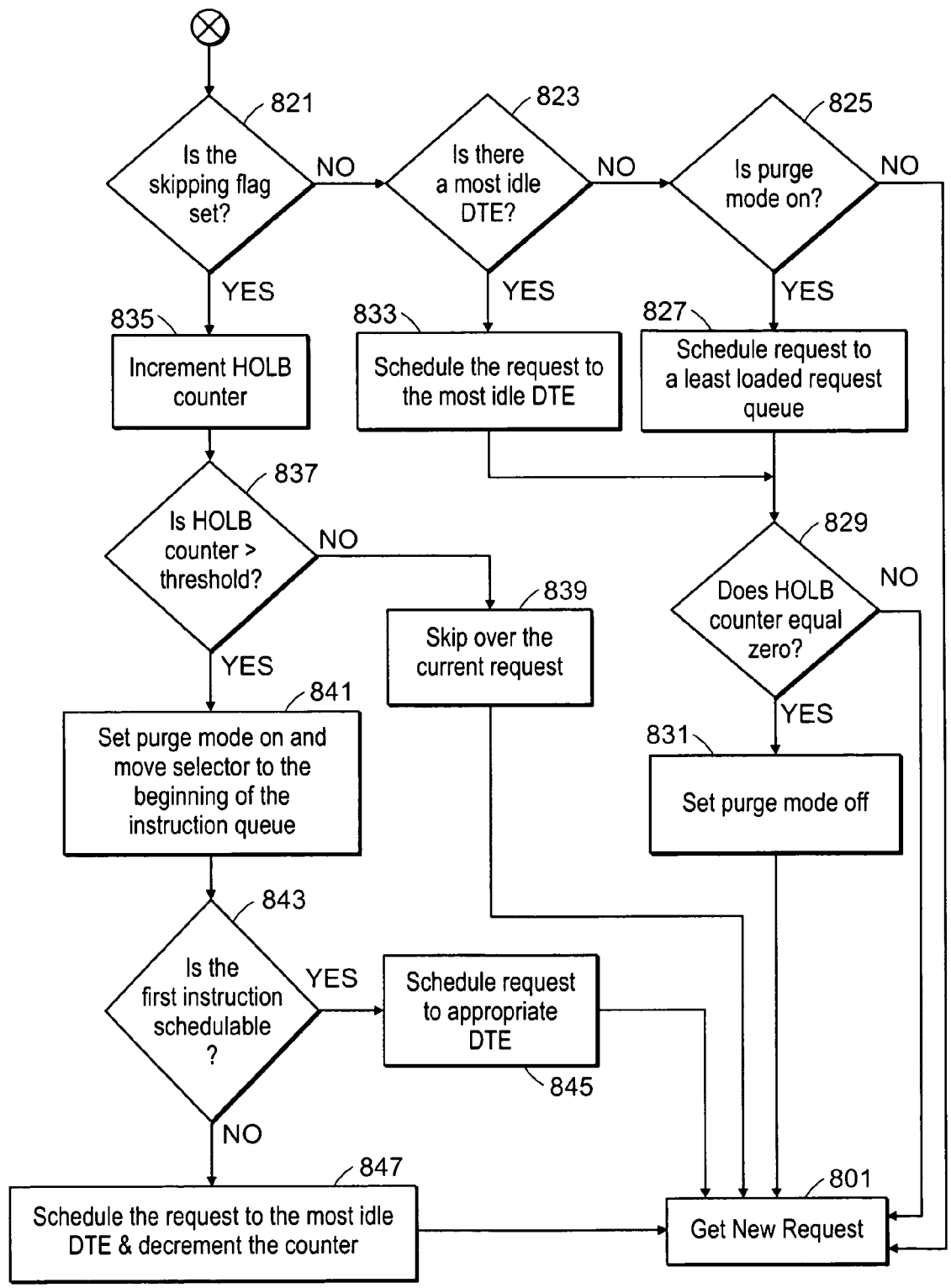
Figure 9:
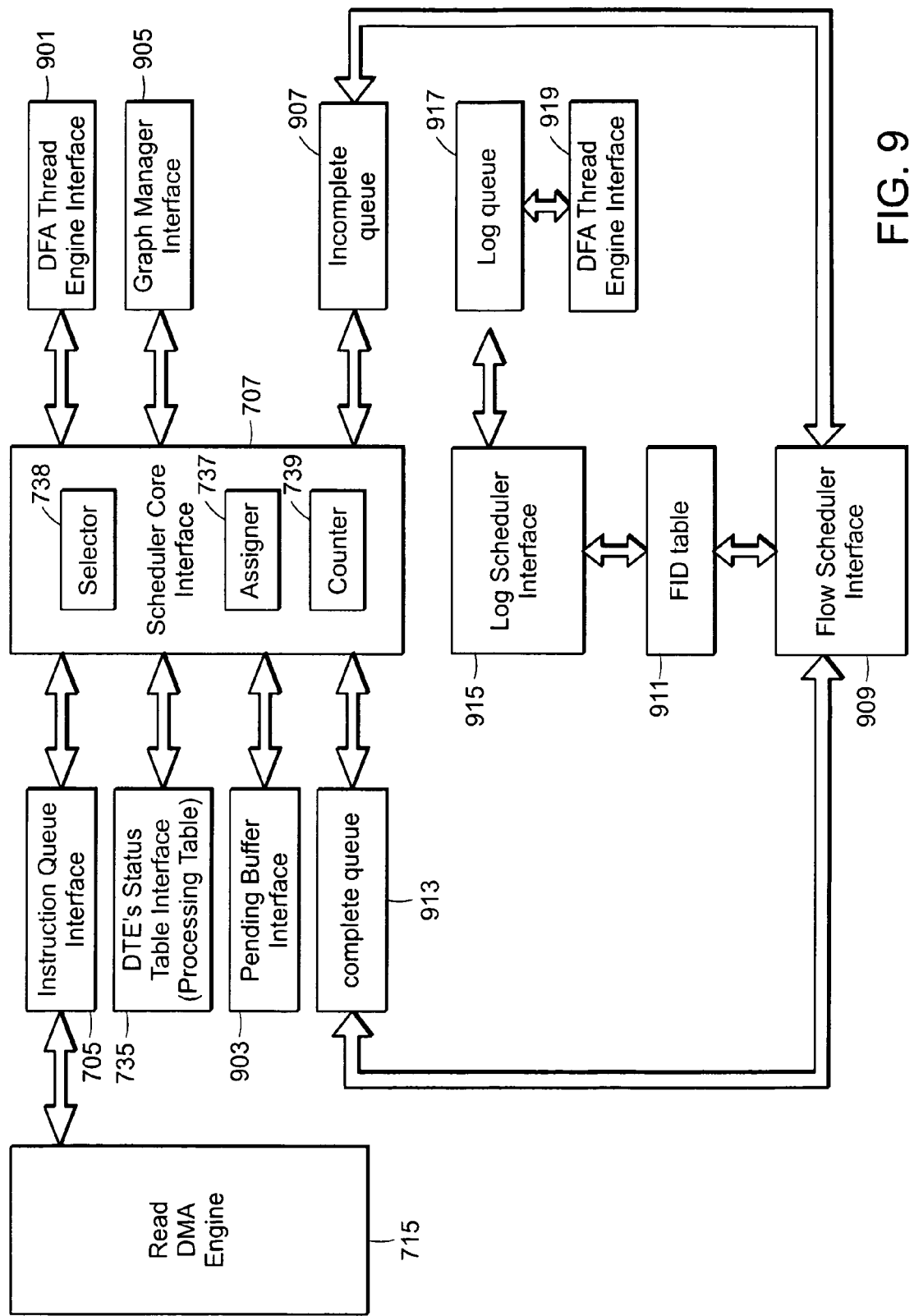
FIG. 9 is a block diagram of the scheduler of FIGS. 7A and 7B and associated components according to example embodiments.

FIGS. 8A and 8B illustrate a flow diagram of an example analysis process the scheduler 707 may undergo in order to determine a right DTE workstation. FIG. 9 illustrates a hardware example of the scheduler 707 and associated components. In example embodiments, once the read DMA engine has transferred the request to the instruction queue 705, the selector 738 of the scheduler 707 may retrieve the new request from the instruction queue 705 (801). If the selector is already at the end of the queue, the selector may move to the top of the queue and select the first instruction in the instruction queue 705 (803, 805). Once the selector has obtain a request, the identification of the DFA associated with the request may be extracted (807).

Upon extracting the graph identification, the processing table 735 may be analyzed to determine if a DTE workstation has been allocated to process requests associated with the identified DFA. For example, the identification of the DFA in the DTE graph cache 747 may be analyzed (809). It should be appreciated that the processing table 735 may be located internal or external of the scheduler 707, as illustrated in FIGS. 7B and 9, respectively.

If it is determined that a DTE workstation has been allocated for the identified DFA, the status of the allocated DTE workstation request queue 745 of the processing table 735 may be analyzed (811). If the request queue is not full, the DFA thread engine interface 901 may place the current request in the request queue of the allocated DTE workstation and the selector may proceed to select another request from the instruction queue (813, 801). If it is determined that the request queue of the allocated DTE workstation is full, the scheduler 707 may analyze the processing table 735 in order to determine if another DTE workstation is allocated for working on the identified DFA (815). If another allocated DTE workstation is identified, its request queue status will also be analyzed (811).

If another allocated DTE workstation is not found, the scheduler 707 will review the allocation status 740 of the processing table 735 to determine if an unallocated DTE workstation exists (817). If an unallocated DTE workstation is found, the DFA thread engine interface 901 may place the current request in the request queue of the unallocated DTE workstation (819).

If an unallocated DTE workstation is not found, the scheduler 707 may proceed to check for DTE flag settings (821). In example embodiments, the flag setting may indicate if a current instruction is to be "skipped" if an appropriate allocated DTE workstation, or an unallocated DTE workstation is not found.

If the skipping flag is not set, indicating requests may not be "skipped" in the instruction queue, the scheduler 707 may search the idle time indicator 743 of the processing table 735 in order to find the most idle DTE (823). If a most idle DTE workstation is found, the DFA thread engine interface 901 may place the current request in the request queue of the most idle DTE workstation (833). If a most idle DTE workstation is not found, the scheduler 707 may determine if a purge mode is on (825). The purge mode setting indicates if the cache of a DTE workstation may be purged. When a DTE workstation is purged, its cache contents may be removed and if the purged DTE workstation is allocated to a specific DFA, the purged DTE workstation may be reallocated to a new DFA.

If the purge mode is off, the scheduler 707 may "skip" the current request and retrieve a new request, which will typically be the next request in the instruction queue (801). Requests that have been "skipped" by the scheduler 707 may be sent to a pending buffer interface 903.

If the purge mode is on, the scheduler 707 may send the current request to a DTE workstation including a least loaded request queue (827). The scheduler 707 may utilize the request queue indicator 745 of the processing table 735 in order to determine which DTE workstation includes the least loaded request queue.

The scheduler 707 may thereafter determine if the counter 739 is equal to zero (829). The counter 739 being equal to zero is an indication that no requests in the instruction queue have been "skipped" or no requests are currently in the pending buffer interface 903. Therefore, if the counter 739 is equal to zero, the purge mode may bet set in an off state (831). Thereafter, the scheduler 707 may retrieve a new request from the instruction queue (801).

If the skipping flag is set, indicating that the current request in the instruction queue may be "skipped," the scheduler 707 may proceed to increment the counter 739 (821, 835). The scheduler may evaluate the counter with respect to Head-Of-Line-Blocking threshold (837). Head of line blocking exists when a request located lower in the queue is capable of being processed and its associated DTE workstation may become idle if the lower request is not processed. Thus, in an effort to avoid head of line blocking the current request may be "skipped" in favor of the lower request so that the DTE workstation associated with the lower request is not left idle.

A threshold may be established determining the maximum number of requests that may be "skipped," or placed in the pending buffer interface 903, before returning to the top of the instruction queue 705 and proceeding to analyze the topmost request. The counter 739 of the scheduler 707 may keep track of the number of requests which have been "skipped" and compare this number to the threshold value. It should be appreciated that the head of line blocking threshold may be alternatively defined. For example, the counter 739 may be used to time stamp each request, and if the current request, or any request above the current request, has not exceeded an allowed time limit, the current request may be "skipped" or placed in the pending buffer interface 903.

If the counter value has not exceeded the threshold value, the current request may be "skipped," or placed in pending buffer interface 903, and the scheduler 707 may retrieve a new request from the instruction queue (839, 801). If the counter value has exceed the threshold value, the purge mode may be set on and the scheduler may retrieve the first request in the instruction queue and determine in the first request is schedulable (841, 843). If the first request is not schedulable, the scheduler 707 may schedule the first request to the request queue of the most idle DTE workstation (847). The scheduler 707 may thereafter proceed to retrieve a new request from the instruction queue (801).

In the example presented above, the requests described are walking requests, or requests specifying an instruction for the walker process. Walking requests are typically sent to the DFA thread engine interface 901 which places the request to an allocated DTE workstation. A second type of request is a Loading request which may be used to specify an instruction to load a certain graph or sub-graph into the local cache of a DTE workstation. Loading requests may also be sent to the DFA thread engine interface 901 which places the loading request in the request queue of the allocated DTE workstation. A third type of request is a download request that may provide instructions to download a certain graph or sub-graph from external memory. Downloading requests may be sent to a graph manager interface 905 which may place the request in the request queue of a DTE workstation that has been allocated. The scheduler 707 may also be configured to schedule sequential requests. Sequential request may include multiple requests that must be processed in order. For example requests 'A', 'B' and 'C' may need to be processed in this order if they represent back-to-back packets belonging to a same flow. In the current example, the processing of B must resume from location in DFA where processing of A stopped. Likewise, the processing of C must resume from location in DFA where processing of B stopped. Processing of 'A' may start from root node (or top) of a particular graph and therefore may be known. While the starting node of requests 'B' and 'C' may not be known until their respective preceding request is processed. The host processor may chose to send requests B & C, without start node information. The "Content Processing Module" will maintain enough information to complete the requests as and when starting node of each request is available.

Once the scheduler 707 identifies a request, which has been assigned to an allocated DTE, as a sequential request the scheduler 707 may place all requests in the sequence in an incomplete queue 907. Once sequential requests have been placed in the incomplete queue 907, a placement indication may be sent to a flow scheduler interface 909. The flow scheduler interface 909 may schedule sequential requests, one by one and in the proper order, by analyzing a flow identification table (FID) 911. The FID table may keep track of the identification of a particular DTE workstation processing a specific set of sequential requests, as well as which request of the set is currently being processed.

Upon analyzing the FID table 911, if the flow scheduler interface 909 determines that a sequential request will shortly be ready for processing, the flow scheduler interface 909 may send a transfer indication to the incomplete queue 905. The transfer indication may prompt the incomplete queue 907 to communicate with the scheduler 707 to place the specified sequential request from the incomplete queue 907 to a complete queue 913.

As DTE 719A, or one of 923A-D, finish processing an instruction which belongs to a sequential set, it mat put a notification along with an identification of the starting node for next request in same sequential set, which may be placed in the Log Queue 917. Log scheduler (915) monitors the Log queue (917) and updates the FID table (911) for the starting state of the subsequent request (in order of processing). As a result of this, the flow scheduler interface (909) (as explained in above paragraph) may move the request from incomplete queue to the complete queue (913). The complete queue (913) may be processed by scheduler core selector (723) and a request may be scheduled to "right" DTE.

Once the right DTE workstation has been identified, the scheduler 707 may send the request to the specified DTE workstation, in the example provided by FIG. 7A the specified DTE workstation is labeled as 713A. The request may be sent to the request queue 709A within the selected DTE workstation 713A. In example embodiments, the request queue 709A may be configured to store up to six entries or requests at a single time. It should be appreciated that this is merely an example and that the request queue 709A may be configured to store any number of requests.

DTE Rx 711A may be responsible for indicating to the DTE Core 719 when the requests of the request queue 709A are ready to be processed. It should be appreciated that the DTE Rx may indicate which request may be processed in the request queue in a first in first out basis, where the request which was sent to the DTE workstation first will be processed first.

The DTE Rx 711A may interact with Read DMA Engine 715 to pull a data packet from system memory via a pointer, with the data packet may be specified in the request. The Read DMA Engine 715 may be utilized by all the DTE workstations (713A-713N) in the Content Processing Accelerator 607. Each DTE workstation may have a dedicated command register in the Read DMA Engine 715 which the DTE Rx may set to initiate the Read DMA Engine 715. Each DTE may also include a dedicated status register with which the DTE Rx may check before processing a new request in order to determine if the processing of a previous request has been completed.

A packet buffer pair may be allocated for each DTE workstation in the Content Processing Accelerator 607, for example packet buffer pair 717A and 718A of DTE workstation 713A. It should be appreciated that any number of packet buffers may be utilized. The DTE Rx 711A may also keep track of the processing status of the pair of packet buffers 717A and 718A.

The DTE Core 719 may be responsible for processing data packets. The Core may be directed on which data packet to process by its command register which is set by the DTE Rx 711A. Processing may involve walking a DFA graph for each byte of data. The walking of the DFA graph may be performed either within the graph cache 721 or within external memory. If an arc points to a node which is not stored in the graph cache, an external memory access may be required. If an external memory access is required, the DTE Core 719 may wait for the data to be retrieved. Once the DTE Core 719 has completed the processing of a data packet, the DTE Core may update a pair of results buffers 721 and 722 with the outcome of the processing.

The DTE Core 719 may continuously switch between the packet buffers 717A and 718A. Once the DTE Core 719 is done processing a first data packet the Core 719 may mark its status as done. Cycles of time spent on processing a single buffer by the DTE Core 719 should be long enough to allow for the transfer of approximately the next 256 bytes over the PCI express 605 from system memory.

As mentioned previously, a request may also include instructions on what to store in a particular graph cache. Such an instruction may be sent because a current request, or a request to be sent later on, may be scheduled for a graph which is not in graph cache of the associated DTE workstation. The DTE Core 719 may pull in cacheable entities of the specified graph from an external memory source and then to process the payload of a data packet, which may have been sent in the same request or a later request. The graph cache 723 may be on a chip cache of the DTE workstation 713A and may be maintained to increase the speed of graph traversal. In example embodiments, larger graph caches may be allocated to be shared by multiple DTE workstations.

The DTE Core 719 may further be configured to normalize, or translate, the format of the incoming request to a format that is compatible for processing within the Content Processing Accelerator 607. Typically, such normalization is performed in software with a scanning procedure performed in hardware. The DTE Core 719 may perform both the normalization and scanning procedures as a hardware solution within the same chip.

A result buffer pair may be allocated for each DTE workstation (713A-713N). The DTE Core 719 may switch between the result buffers 721 and 722 when one is full and update its status. After switching, the DTE Core 719 may pool for the status of the other buffer and proceeds only when it is available for the DTE Core 719.

DTE Tx 725A may be used to indicate to the DTE Core 719A when the results of the data processing may be sent to the result buffer pair 721A and 722A. The DTE Tx 725A may keep track of the processing status of the result buffer pair 721A and 722A. Whenever the DTE Core 719A marks a result buffer as being full or available, the DTE Tx 725 may issue a request to the Write DMA Engine 727 to transfer the data via the pointer. Once the data is transferred successfully, the DTE Tx 725 may mark the results buffer as available. Write DMA engine 727 may be utilized by all the DTE workstations (713A-713N) in the Content Processing Accelerator 607. Each DTE workstation may have a dedicated command register in the Write DMA Engine 727 from which the DTE Tx may set to initiate the Write DMA Engine 727. Each DTE workstation may also include a dedicated status register, which the DTE Tx may check before making a new request to ensure the processing of a previous data packet has been completed. The DTE Tx 725 may also assist in sending the results of the data processing out of the Content Processing Accelerator 607 via a pointer.

The DDR2 (or DDR II SDRAM) interface logic 729 may be used for handling requests to access external memory from different DTE workstations (713A-713N). A number of DDR2 controllers 731(0)-731(7) may be utilized in accessing the external memory units 733(A)-733(N). In example embodiments, a total of 96 DTE workstations may be included in the Content Processing Accelerator 607 and the interface logic 729 may allocate 12 DTE workstations per controller resulting in the use of 8 DDR2 controllers 731(0)-731(7). Each of the controllers 731(0)-731(7) may support approximately 16 memory units with up to two devices per interface. If each device is 1 Gb, each interface may have 256 Mb of memory available. For a 10 Gb product with eight interfaces the total memory supported may be 2 Gb.

The arbitration between the different DTE workstations for a same controller may be based on a first come, first serve manner. The interface logic 729 keeps the context of the request from each DTE workstation and in turn makes a request to the corresponding DDR2 controller. When data is returned from the DDR2 controller, it responds to the DTE workstation using the context information stored earlier. In example embodiments, each DTE workstation may have one outstanding request at a time.

It should be appreciated that different arcs of a DFA graph may be stored across the multiple memory units 733(A)-733(N). Such a configuration may be useful for the case where a large number of requests are made for a single DFA graph. In typical content search systems, this scenario may cause a memory bottle neck problem, where multiple DTE workstations are attempting to access the same memory unit. In separating DFA graphs across multiple memory units the likelihood of accessing the same memory unit is lessened. Thus, the impact of the memory bottle neck problem may be greatly reduced.

Figure 10:
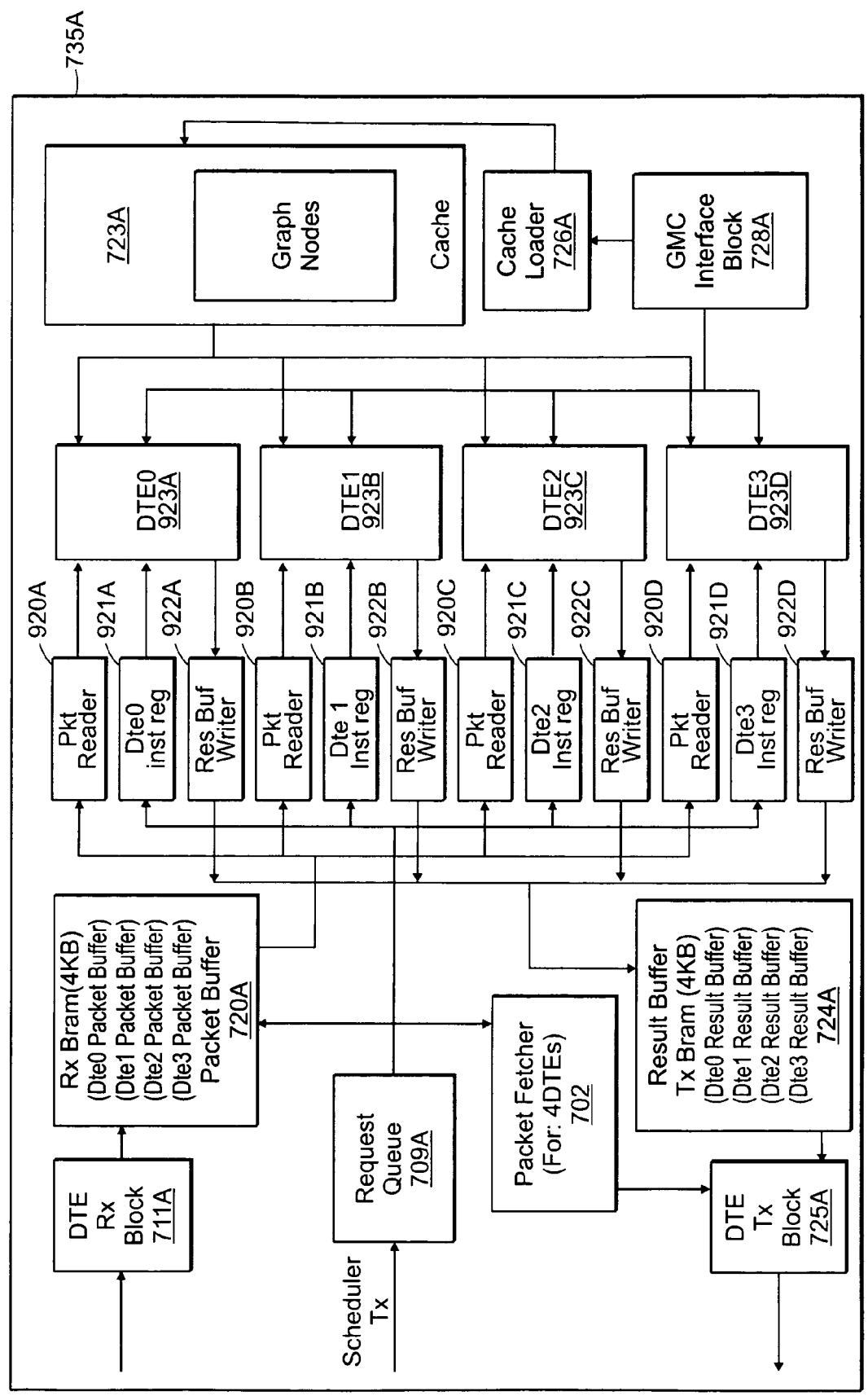
FIG. 10 is a block diagram of a DFA Thread Engine (DTE) cluster that may be included in the Content Processing Accelerator of FIG. 7A.

In an example alternative embodiment, the DTE workstations of the Content Processing Accelerator may include DTE clusters stations. FIG. 10 illustrates an example of a DTE cluster station 735A. Similar to the DTE workstations described in FIG. 7A, the DTE cluster station 735A may include a request queue 709A, a DTE Rx block 711A, a DTE Tx block 725A, and a graph cache 723A which may function in the same manner. The DTE cluster station 735A may also include a graph memory control (GMC) interface block 728A that may be configured to send external memory access requests to the DDR2 interface logic. The DTE cluster station may also include a cache loader 726A that may be configured to store any DFA graph components retrieved from external memory in the DTE cluster cache 723A. Note that while not illustrated, the DTE workstation example of FIG. 7B may also include a cache loader 726A and a GMC interface block 728A.

A single DTE cluster station may also feature multiple DTE cores. The example cluster station 735A of FIG. 10 illustrates four DTE cores 923A-923D. Each of the DTE cores 923A-923D included in a DTE cluster station may include a packet reader 920A-920D, a instruction register 921A-921D, and a result buffer writer 922A-922D, respectively. Note that all the DTE cores in a DTE cluster station may be configured to operate on a same DFA graph or subgraph. Therefore, once a request has been sent to the request queue 709A, the request queue may send the request to any DTE instruction register of the cluster in a random or round-robin fashion.

Once an instruction has been placed in the instruction register, the associated packet reader may retrieve the packet from the packet buffer 720A and thereafter send the packet to the associated DTE core. A packet fetcher 702 may be configured to monitor the space availability of the packet buffer 720A. As more space becomes available in the packet buffer 720A, the packet fetcher 702 may send instructions to the DTE Tx block 725A to retrieve more requests.

Once the DTE core has completed processing the packet, the core may send the processing results to the associated result buffer writer. The associated result buffer writer may thereafter send the results to the result buffer 724A to be transferred out via the DTE Tx block 725A. It should be appreciated that any number of DTE cores may be included in a single DTE cluster station.

While this invention has been particularly shown and described with references to example embodiments thereof, it will be understood by those skilled in the art that various changes in form and details may be made therein without departing from the scope of the invention encompassed by the appended claims.

What is claimed is:

1. A processor for scheduling a request to a deterministic finite automata-based graph thread engine (DTE) workstation, the processor comprising:
   a selector configured to select a request from an instruction queue and to extract from the selected request, a graph identifier for a deterministic finite automata-based (DFA) graph associated with the selected request;
   a scheduling table configured to provide placement information for choosing which of a plurality of DTE workstations, including one or more DTE workstations allocated to process requests associated with the DFA graph, to send the request to be processed, the placement information being provided based on the graph identifier extracted from the selected request; and
   an assigner configured to determine which of the plurality of DTE workstations to send the request to be processed, based on the placement information.

2. The processor of claim 1 wherein the request includes processing instructions associated with the DFA graph associated with the request.

3. The processor of claim 1 wherein the request includes graph cache reassignment instructions.

4. The processor of claim 1 wherein the request includes instructions to assign a DFA graph associated with the request to at least one DTE workstation.

5. The processor of claim 4 wherein the instructions are static instructions and the at least one DTE workstation is not thrashable.

6. The processor of claim 1 wherein the provided placement information being further based on a DTE identifier.

7. The processor of claim 1 wherein the placement information is an indication listing including at least one DTE workstation that is currently processing DFA graph associated with the request.

8. The processor of claim 1 wherein the placement information is a request queue status of at least one DTE workstation associated with the attribute.

9. The processor of claim 1 wherein the placement information is an idleness factor of at least one DTE workstation.

10. The processor of claim 1 wherein the placement information is an allocation status.

11. The processor of claim 1 wherein the placement information is a modification setting.

12. The processor of claim 1 wherein the placement information is a flag setting.

13. The processor of claim 1 wherein if there are no available DTE workstations allocated to process the request associated with the DFA graph, the assigner is configured to select a suitable DTE workstation based solely on the placement information.

14. The processor of claim 13 wherein the suitable DTE workstation is an unallocated DTE workstation.

15. The processor of claim 13 wherein the suitable DTE workstation is a most idle DTE workstation.

16. The processor of claim 13 wherein the suitable DTE workstation is a purged DTE workstation.

17. The processor of claim 1 further comprising a counter configured to determine an allowed number of requests that are skipped in the instruction queue by the assigner.

18. The processor of claim 1 wherein the scheduling table is dynamically updated by a scheduler, and/or an individual DTE workstation.

19. The processor of claim 1 wherein an individual DTE workstation includes at least one core processor that is configured to normalize a payload of the request and traverse the DFA graph associated with the request.

20. The processor of claim 1 wherein an individual DTE workstation includes a local graph cache configured to store a DFA graph associated with a request.

21. The processor of claim 1 further comprising a system memory unit wherein different arcs of the DFA graph associated with the request are stored across multiple memory interfaces.

22. The processor of claim 1 wherein the request is a member of a sequential set of requests and the assigner is configured to assign all requests of the sequential set to a same DTE workstation to be processed in order.

23. The processor of claim 1 wherein an individual DTE workstation includes a DTE cluster featuring a plurality of DTE cores configured to process a same DFA graph.

24. A method for scheduling a request to a deterministic finite automata-based graph thread engine (DTE) workstation, the method comprising:
   selecting a request from an instruction queue;
   extracting from the selected request, a graph identifier for a deterministic finite automata-based (DFA) graph associated with the selected request;
   accessing a scheduling table with the extracted graph identifier for the DFA graph associated with the request to determine placement information for choosing which of a plurality of DTE workstations, including one or more DTE workstations allocated to process requests associated with the DFA graph, to send the request to be processed; and
   determining which of the plurality of DTE workstations to send the request to be processed based on the placement information.

25. The method of claim 24 including providing processing instructions associated with the DFA graph associated with the request.

26. The method of claim 24 including providing graph cache reassignment instructions with the request.

27. The method of claim 24 including providing instructions to assign a DFA graph associated with the request to at least one DTE workstation.

28. The method of claim 27 wherein the instructions are static instructions and the at least one DTE workstation is not thrashable.

29. The method of claim 24 wherein the placement information being further determined based on a DTE identifier.

30. The method of claim 24 including providing with the placement information, an indication listing including at least one DTE workstation that is currently processing DFA graph associated with the request.

31. The method of claim 24 including providing with the placement information, a request queue status of at least one DTE workstation associated with the attribute.

32. The method of claim 24 including providing with the placement information, an idleness factor of at least one DTE workstation.

33. The method of claim 24 including providing with the placement information, an allocation status of at least one DTE workstation.

34. The method of claim 24 including providing with the placement information, a flag setting of at least one DTE workstation.

35. The method of claim 24 including selecting a suitable DTE workstation based solely on the placement information if there are no available DTE workstations allocated to process the request associated with the DFA graph.

36. The method of claim 35 wherein the suitable DTE workstation is an unallocated DTE workstation.

37. The method of claim 35 wherein the suitable DTE workstation is a most idle DTE workstation.

38. The method of claim 35 wherein the suitable DTE workstation is a purged DTE workstation.

39. The method of claim 35 including skipping the request in the instruction queue and selecting another request in the instruction queue if there is no suitable DTE workstation.

40. The method of claim 39 including determining an allowed number of requests that are skipped in the instruction queue.

41. The method of claim 39 including determining an allowable duration of time that the request is allowed to remain in the instruction queue.

42. The method of claim 24 including dynamically updating the scheduling table.

43. The method of claim 24 including normalizing a payload of the request and traversing the DFA graph associated with the request within an individual DTE core processor of the DTE workstation.

44. The method of claim 24 including storing a DFA graph associated with a request within a local cache of an individual DTE workstation.

45. The method of claim 24 including storing different arcs of the DFA graph associated with the request across multiple memory interfaces.

46. The method of claim 24 wherein the request is a member of a sequential set of requests, the method further including assigning all requests of the sequential set to a same DTE workstation to be processed in order.

47. The method of claim 24 wherein an individual DTE workstation includes a DTE cluster featuring a plurality of DTE cores processing a same DFA graph simultaneously.

48. A processor for scheduling an request to a deterministic finite automata-based graph thread engine (DTE), the processor comprising:
means for selecting a request from an instruction queue;
means for extracting from the selected request, a graph identifier for a deterministic finite automata-based (DFA) graph associated with the selected request;
means for providing placement information for choosing which of a plurality of DTE workstations, including one or more DTE workstations allocated to process requests associated with the DFA graph, to send the request to be processed, the placement information being provided based on the graph identifier extracted from the selected request; and
means for determining to which of the plurality of DTE workstations to send the request and process the request based on the placement information.

* * * * *